Patented Dec. 28, 1926.

1,612,087

UNITED STATES PATENT OFFICE.

RICHARD D. ZUCKER, OF BROOKLYN, NEW YORK, ASSIGNOR, BY MESNE ASSIGNMENTS, TO FRANKLIN BAKER COMPANY, OF HOBOKEN, NEW JERSEY, A CORPORATON OF NEW JERSEY.

FOOD PRODUCT AND METHOD OF MANUFACTURING THE SAME.

No Drawing. Application filed August 3, 1920, Serial No. 400,982. Renewed December 30, 1924.

This invention relates to food products and to a process of preserving in a desirable stabilized state food products such as fresh or partially dried coconut in moist or wet condition and in such manner as (1) to prevent or minimize bacteria, mold or yeast development; (2) to prevent or destroy any deleterious enzymic activity; (3) to prevent contamination of the coconut or other food product by metallic compounds derived from the interior of the container.

The first object is accomplished, in the main, by establishing a condition which prevents the moisture present in the product, or in the can or container, from becoming suitable as a medium in which the bacteria or other micro-organisms present can develop.

Micro-organisms require water in an available form for their growth. By adding an amount of a saccharide, for example, sucrose, dextrose, invert sugar, or a mixture of any of these, in a quantity large enough to form a concentrated solution with the water component of the coconut, or enough to saturate or supersaturate the water with one or more of these saccharides, the moisture of the coconut is placed in an unassimilable form for the development of most bacteria and many molds and yeasts.

The addition of common salt in quantities of 1/10 of 1% to 2% of the total weight of the product is a further preventive of the development of objectionable micro-organisms, establishing another condition which is instrumental in inhibiting development of micro-organisms. Although the percentage of salt in relation to the total weight of the product is comparatively low, when calculated in relation to the water alone, it is of a concentration high enough to prevent, inhibit, or assist in the prevention or inhibition of the development of bacteria, molds and yeasts.

A third factor may be added having substantially the same effect as the salt. One or more of the harmless acids used generally in food products, such as citric, tartaric, malic, phosphoric, acetic, or mixtures containing one or more of these acids, which would tend to increase the acid reaction of the product, may be added in quantities that are not objectionable to the taste, digestion or metabolism, but sufficient to tend to inhibit the development of forms of micro-organic life.

By such additions, the hydrogen ion concentration of the water is made comparatively high. It is well recognized that increased hydrogen ion concentration tends to inhibit the development of many of the more objectionable micro-organisms and also may restrict the activity of enzymes inherent in the product or previously evolved by micro-organisms. Heat resistant bacteria are almost without exception prevented from developing by a high concentration of hydrogen ions. The growth of yeast and molds is in some cases favored by a high hydrogen ion concentration, but these micro-organisms may be easily killed or prevented from developing by means of treatment which will be hereinafter described.

In practice, the amounts of sugar, salt and acid are regulated to accomplish the results desired, and at the same time to please the taste of the consumer, it being borne in mind that the important fact to be considered, from the standpoint of preservation, is the ratio of the various ingredients to the water content, rather than the total amount added. In determining a safe amount of sugar or other saccharide, salt or acid to be added, it is well to allow for the increased solubility of most substances with increase in temperature. For example, a saturated solution of the saccharide, sucrose, at 40° C. would be supersaturated at a temperature lower than 40° C. under practical conditions, the product would never be stored at a temperature in excess of 40° C. and therefore the sugar solution in the product would never be less than saturated.

In actual practice, the saccharide and other ingredients, if the latter are used, may be added in requisite amounts to coconut containing an excess of moisture and then the mass be dried until the moisture content is approximately saturated with sugar. Other ways of combining the ingredients are possible, provided the resulting product fulfills the prescribed conditions.

The addition of the substances mentioned in the manner described has a direct inhibitive effect on bacteria, yeast and molds, as well as a more or less indirect inhibitive effect on the action of enzymes and metallic contamination of the the product from the walls of the container.

Rancidity in coconut is caused by the activity of enzymes on the oil content, followed by the action of oxygen. The enzymes which act upon the oil so as to split it into its constituents, glycerine and fatty acids, may be naturally contained in the coconut or may be evolved from molds or other mircoorganisms. When such enzymes have acted upon the fat in the coconut and caused the development of fatty acids, oxygen is then able to act directly upon the fatty acids, producing objectionable flavor changes known as rancidity. Enzymes require a certain amount of water for the exercise of maximum activity, so the saturation of the water content of the food product has a strongly inhibitve effect on them.

My invention further proposes to eliminate the action of micro-organisms and enzymes and to prevent rancidity and other spoilages (1) by taking further steps to kill or prevent the growth of the micro-organisms and destroy the enzymes and, (2), by depriving the product of the oxygen necessary to complete the process of rancidification, replacing the contained air with a chemically inert gas.

Owing to the peculiar nature of the coconut prepared with a saccharide in a moist condition, it is not practical to submit it to the degree of heat ordinarily used in sterilizing coconut. But the previously described method of saturating the water content of the coconut with a saccharide and possibly other ingredients makes a high degree of sterilization unnecessary. However I find it beneficial to submit the coconut to a heat treatment after preparation and sealing, high enough to kill the micro-organisms otherwise prevented from growing but low enough to insure the coconut retaining its normal white appearance, taste and flavor. In practice, a boiling water bath at 100° C. is used but this temperature may be varied to a limited degree to compensate for minor changes in composition of the product.

Under certain conditions it may be desirable to heat the coconut in bulk form, for the double purpose of inactivating or destroying enzymes and at the same time leaving the product sufficiently warm so that after sealing in a can, cooling of the product will result in a slight vacuum in the interior of the can. This slight vacuum prevents the can from swelling in the event that it is shipped to a warmer climate than the point of manufacture.

As a final means of accomplishing stabilization and preservation of coconut prepared as previously described, the air in the container is replaced with an atmosphere of inert gas such as carbon dioxide, nitrogen, helium, etc. By this means air may be eliminated to any degree desired. In practice the elimination of 95% is found to accomplish the result desired.

The advantages gained by substituting an inert gas for air in the container, are as follows:

(1), oxygen is almost completely eliminated and this means the elimination of the action of oxygen on the iron of the container and of the action of oxygen on the coconut itself;

(2), the pressure differential between the interior and the exterior of the can is lowered to such an extent that the seams of the can are better able to withstand the pressure of the outside air;

(3), the gas furnishes a conducting medium through which heat is better conducted into the center of the can, thus facilitating complete and thorough sterilization;

(4), molds and other aerobic organisms which possibly may not be destroyed by the sterilization are prevented from developing by the presence of the inert gas.

The latter is an important extra safeguard for the reason that the nature of the product compels a "mild" heat processing which is not far removed from the point of safety. The gas thus serves as a second defense in the event that molds and aerobic bacteria may survive the mild heat treatment used.

The product, after being prepared as described, may be filled into cans and covers with small holes may be seamed on the cans by usual can closing methods. Through these small holes the air may be withdrawn by a vacuum pump and after such withdrawal the gas may be allowed to enter until the pressure within is at least as great as that of the outside air. The can may then be brought out into the open and the small holes tipped with solder. During the interval between gas filling and tipping, the gas remains in the cans with little or no contamination from the outside air for the reason that the pressure in the cans corresponds to atmospheric and there is therefore no pressure differential to cause a flow in either direction. The product may be filled into the cans slightly warm or the gas be heated so that when the cans have been finally sealed and processed and the temperature brought down to normal by cooling, a slight vacuum exists in the cans.

In the heat treatment, too high a temperature should obviously not be used because discoloration of the material is to be avoided. While I have indicated particular steps of treatment as being directed against particular spoilage factors, it should be remembered that in practice one particular treatment may affect more than one spoilage factor.

I have obtained excellent results with comminute coconut by saturating the moisture content with a saccharide at 40° C.; hermetically sealing in a container in an atmosphere of inert gas, or at any rate, substantially without free oxygen; and subjecting to partial sterilization. Partial sterilization kills enzymes and some of the other spoilage agents, without seriously affecting the appearance, flavor and consistency of the coconut. And the saccharide, with the inert gas, or in the substantial absence of oxygen, provides an inhibiting agent or medium which, while it leaves unchanged the flavor, appearance and consistency of the coconut, is effective to complete the stabilized condition partly accomplished by the partial sterilization.

The method of treatment and packaging disclosed insures the preservation of a moist food product, such as comminute coconut, in an attractive, wholesome condition, and the keeping of the product in that condition until the receptacle is opened. I am aware that individual steps of the process herein described have been suggested by others and that processes have been utilized including more than one of the particular operations to which I have referred. But so far as I am aware, moist food products, such as coconut, have not heretofore been prepared and packaged in a metallic container with provision for the inhibition or inactivation of bacteria, molds, yeasts and enzymes and for preventing contamination of the material with metal compounds that might be derived from the interior of the container. My process therefore involves a new combination of treatments, each treatment intended to accomplish a particular result, and all cooperating to attain a unitary and general result, to wit, the substantially complete and permanent stabilization of a moist food product in an attractive, wholesome condition.

While I have explained the details of my invention with particular reference to comminute coconut, it will be obvious that it is applicable also for the preservation of other nuts; and therefore I intend that the word "coconut" when used in the claims is to be interpreted to mean the class of articles whose preserving problems are substantially those of coconut.

I claim:
1. The process of preserving coconut which comprises the steps of adding to the coconut an amount of saccharide approximately sufficient to saturate the moisture content of the coconut at 40° C., hermetically sealing the material in an atmosphere of inert gas, and subjecting the coconut to a mild heat treatment at approximately 100° C.

2. The process of preserving coconut which comprises the steps of adding to the coconut an amount of saccharide approximately sufficient to saturate the moisture content of the coconut, hermetically sealing the material in an atmosphere of inert gas, and subjecting the coconut to a mild heat treatment.

3. As a new article of manufacture, a hermetically sealed package containing, substantially without free oxygen and without free liquid, a partially sterilized, moist, comminute coconut possessing the appearance and approximating the consistency of raw coconut, said comminute coconut being substantially free from active bacteria, molds, yeasts and enzymes.

4. As a new article of manufacture, a hermetically sealed package containing in the substantial absence of free oxygen, a moist, comminute coconut possessing the appearance and approximating the consistency of raw coconut, said comminute coconut having its moisture content approximately saturated with a saccharide.

5. As a new article of manufacture, partially sterilized moist, comminute coconut possessing the appearance and approximating the consistency of raw coconut, and contained in a hermetically sealed container together with a medium which completely inhibits the deleterious activities of bacteria, molds, yeasts and enzymes.

6. The method of preparing and packaging a moist comminute coconut in a metal container so that it will be and remain in a stabilized condition, which consists in subjecting it to partial sterilization, and additionally treating it to inactivate deleterious bacteria, molds, yeasts and enzymes present with the coconut, and which further includes the step of hermetically sealing the coconut in a metal container substantially without free oxygen.

In testimony whereof I affix my signature.

RICHARD D. ZUCKER.